Feb. 25, 1941. J. H. HOTSON 2,232,703
TIE HOLDING COLLAR BAR
Filed July 9, 1938 2 Sheets-Sheet 1
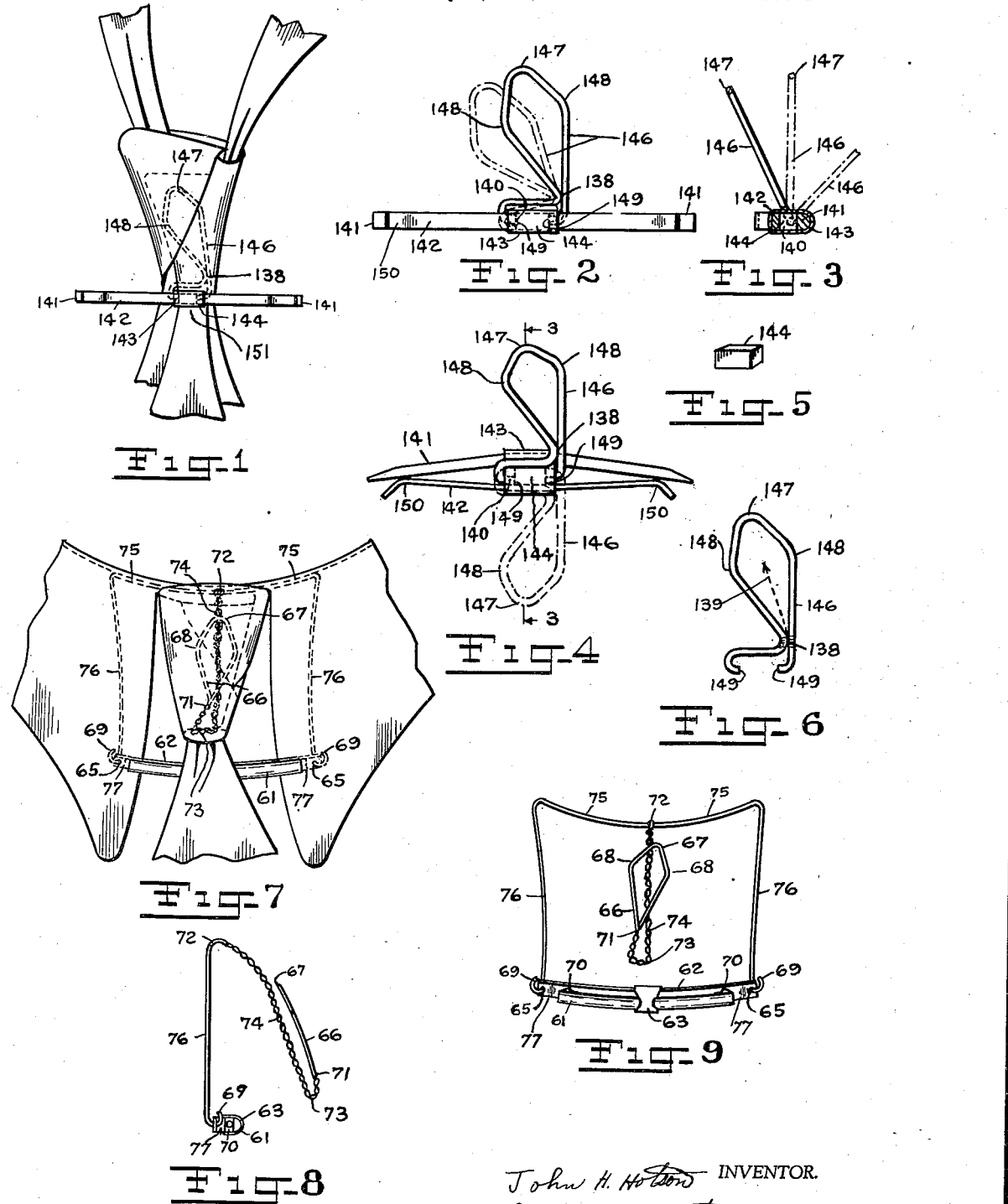
John H. Hotson INVENTOR.
BY Edmond Livingstone Brown
ATTORNEY.

Feb. 25, 1941.    J. H. HOTSON    2,232,703
TIE HOLDING COLLAR BAR
Filed July 9, 1938    2 Sheets—Sheet 2
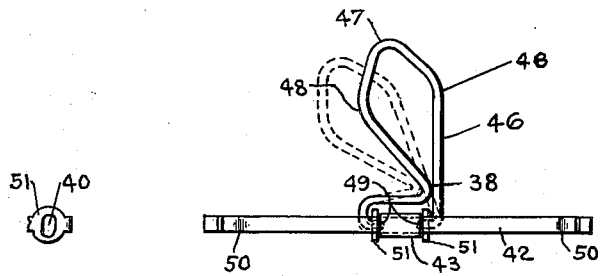
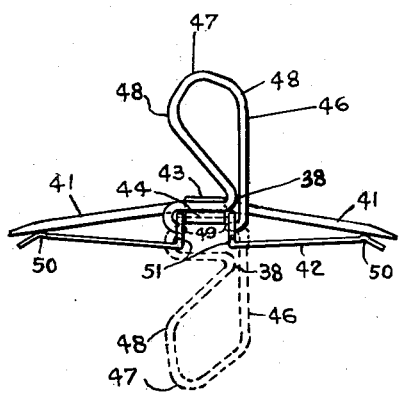
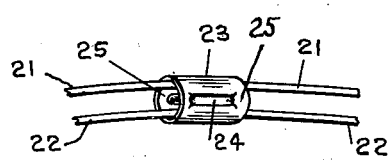
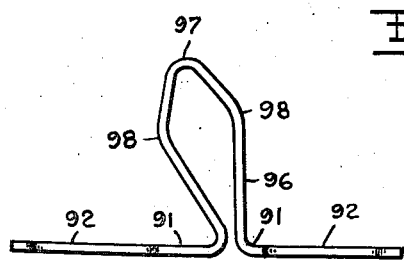
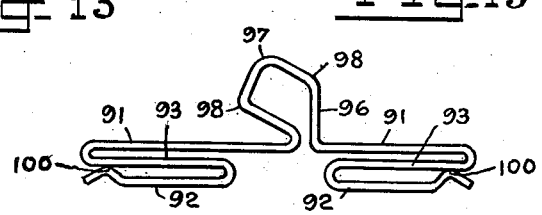
John H. Hotson  INVENTOR.
BY Edmond Livingstone Brown
ATTORNEY.

Patented Feb. 25, 1941

2,232,703

UNITED STATES PATENT OFFICE 2,232,703

TIE HOLDING COLLAR BAR

John H. Hotson, Woodside, Long Island, N. Y.

Application July 9, 1938, Serial No. 218,333

13 Claims. (Cl. 24—81)

The invention relates to neckwear appliances, and more particularly to devices for attachment to collars and neckties.

This application is a continuation in part of my co-pending application bearing Serial Number 51,562, filed November 26, 1935, which application was allowed by the Patent Office on January 11, 1938. The subject matter of Figs. 7, 8 and 9 hereof, as well as portions of the subject matter of the other figures of the drawings hereof, has been shown and described in the said co-pending application. I do not intend in filing this application to abandon any of the subject matter of said co-pending application which comes within the scope of claims of this application, whether or not such subject matter is shown or described herein.

The principal object of the invention is to provide simple, efficient and convenient means for retaining the knot of a necktie in proper relation to the collar front. Further objects and advantages of the invention will be in part set forth in the following specification, and in part will be obvious therefrom without being specifically pointed out, the same being realized and attained as hereinafter more fully described or as pointed out in the claims hereof.

With the above and other objects of the invention in view, the invention consists in the novel construction, arrangement and combination of various devices, elements and parts as set forth in the claims hereof, certain embodiments of the same being illustrated in the accompanying drawings and described in this specification.

In the said drawings,

Fig. 1 is a rear view of one embodiment of my invention, showing the same engaging the knot of a necktie.

Fig. 2 is a rear view of the same, removed from the necktie.

Fig. 3 is a section on the line 3—3 of Fig. 4.

Fig. 4 is a plan view of Fig. 2.

Fig. 5 is a detail view of the central block shown in Figs. 1, 2, 3 and 4.

Fig. 6 is a detail view of the tie-engaging loop shown in Figs. 1, 2, 3 and 4.

Fig. 7 is a front view of another embodiment of my invention, showing the same in use.

Fig. 8 is a side view thereof.

Fig. 9 is a front view of the embodiment shown in Figs. 7 and 8, removed from the necktie.

Fig. 10 is a rear view of another embodiment of my invention.

Fig. 11 is a plan view of Fig. 10.

Fig. 12 is a detail view of a portion of the rear collar bar member shown in Figs. 10 and 11.

Fig. 13 is a view of another embodiment of my invention.

Fig. 14 is a rear view of another embodiment of my invention, and

Fig. 15 is a plan view of Fig. 14.

In carrying my invention into effect in the embodiment thereof which has been selected for illustration in Figs. 1 to 6 inclusive, it will be seen that there is provided a collar bar, which may be of any suitable form, comprising a front bar member 141 and a rear bar member 142. These front and rear members are spaced apart at the center by a block 144. A binding member 143 surrounds the front and rear members and the block 144 secures them all rigidly together. This binding member is wider than the length of the block 144, in order that when the device is assembled sockets 140 shall be formed at each end of said block 144. In each of said sockets, one end of the block 144 forms the bottom, while portions of the front and rear bar members 141 and 142 and portions of the binding member 143 form the sides and ends. The free ends of the rear member 142 are provided with forward extensions 150 which engage resiliently with the front bar member 141, and permit the device to be clipped over the wings of a collar in the usual way.

A wire loop 146 is provided (shown separately in Fig. 6) which, when the device is worn, is thrust upward into the first-formed convolution of the knot of a four-in-hand necktie immediately behind the hanging end which is enclosed within the said convolution. The bottom of the rear side of the knot will then be held firmly against the center of the bar, and when the bar is in place on the collar the knot cannot sag, while at the same time the bar may be worn low enough on the collar to avoid producing a crowded appearance.

The loop 146 is formed of resilient material, and the free ends 149 (see Fig. 6) may be snapped in or out of the sockets 140. This permits loops of various sizes to be attached at will to collar bars of various designs, thus permitting any collar bar to be worn with ties of different weights, which form larger or smaller knots. The wire forming the loop is also bent to bear resiliently against itself at the point 138, thereby facilitating the manufacturing of the device by easily insuring a uniform distance between the points 149, as well as helping to preserve this uniformity of distance after the device is put in use.

The loop 146 is so constructed that the point 138 is somewhat offset from the central point longitudinally of the bar member 141, for the reason that the primary knot of a four-in-hand tie, into which the loop 146 is adapted to be thrust, is off to one side of the main knot of the tie (as shown at 151 in Fig. 1), and by locating the point 138 the same distance off from the central point of the bar member 141, the main knot of the tie at its bottom end is made to set medially on the bar member, after the loop 146 is thrust up into the primary knot. Even if the two lower portions of the loop 146 did not come together at 138, but had some space between, the result of the offsetting of the central point between them would be to cause the main knot of the tie at its bottom end to set centrally on the bar member 141.

The upper end of the loop 146 is narrowed down as shown at 147 in order to facilitate insertion into the knot of the tie, while the central portion is widened at 148 in order to provide better holding power.

The loop 146 is so formed that the median line thereof, that is, the imaginary line connecting the center of the broadest part of the loop with the point 138, which line is shown in Fig. 6 and designated 139, is inclined longitudinally with relation to the general line of the collar bar portion of the device. This adaptation enables the loop to fit more naturally within the convolutions of the knot, which are asymmetrical. The loop 146 is not only detachable from the collar bar portion, but reversibly attachable thereto, which enables the user, who may be in the habit of tying either a right-hand or a left-hand knot, to adjust the direction of inclination of the line 139 as desired.

Since the free ends 149 of the loop 146 have a certain freedom of motion, both rotary and sliding, within the sockets 140, the loop 146 may assume various positions relative to the collar bar portion, such as shown in dotted lines in Figs. 2, 3 and 4, and thereby enable the device to adjust itself to various relative positions of tie and collar, without however permitting the tie to sag with relation to the collar.

While my preferred form is a loop with the free ends held in sockets such as those already described, which may be sprung out and the loop separated from the bar collar holder, I do not wish to limit myself to such a form, but my device may be constructed with the loop rigidly or undetachably connected with the bar members.

Nor do I wish to limit myself to the wire construction of the upwardly projecting member, as obviously it could be stamped out of flat stock, and it may be constructed either in the loop form or without a central aperture in the upwardly projecting member. Nor do I limit myself to the upwardly projecting member being attached at two points, as it is also obvious that it could be mounted on the bar collar holder at only one point and could tilt or swing equally as well as if it were mounted at two points. I prefer to use two for convenience in controlling the movements of the upwardly projecting member.

In the embodiment shown in Figs. 7, 8 and 9, I provide a collar bar comprising a front member 61 provided at its rear ends with rearward extensions 70 adapted to engage resiliently with the free ends of a rear member 62, and a binding member 63.

In this embodiment the loop 66, with its narrow upper portion 67 and widened middle portion 68, is formed from the center of a length of wire the ends of which, after being brought together at the bottom of the loop, are twisted together between the points 71 and 72. The twisted portion is bent rearwardly from the bottom of the loop 66 at 73, and upwardly and rearwardly therefrom at 74. From the point 72 the ends of the wire are separated, and each end extends outwardly at 75 in a curved line to follow the inside of the top fold of the collar. Each end is then bent downwardly at 76, from a point approximately over each outer end of the rear bar 62 and hooked at 69 through a perforation 65 therein. The outer ends of the rear bar member 62 are each rearwardly inclined at 77 in order that the hooks 69 may not catch the wings of the collar.

The use of this embodiment of my invention permits the necktie to be held in such a position that it may project forwardly from the shirt, more or less according to the taste of the wearer, by bending the portion 74 outwardly or inwardly with relation to the portion 76; and also permits the collar bar to be worn in a lower position than would otherwise be the case.

In carrying my invention into effect in the embodiment shown in Figs. 10, 11 and 12, I provide a front bar member 41 and a rear bar member 42. The rear bar member is bent to form a central forwardly extending offset 44 which is shown in dotted lines in Fig. 11 and which serves to space the front and rear bar members properly with relation to each other at the central portions thereof. A binding member 43 surrounds the center of the front member 41 and the offset portion 44 of the rear member 42, and secures them rigidly together.

Adjacent the offset 44 at each end thereof, and between the said offset and the main portions of the rear bar member 42, I provide journal portions 51, also integral with the material of the rear bar member 42, which are enlarged vertically as shown in Fig. 12 in order that each journal portion may accommodate a vertical slot 40.

A wire loop 46 is provided, analogous to the loop 146 of the embodiment shown in Figs. 1 to 6 inclusive, which is formed of resilient material, and provided with free ends 49 which may be snapped in or out of the slots 40. The wire forming this loop is bent to bear resiliently against itself at the point 38. The upper end of the loop is narrowed down at 47 in order to facilitate insertion into the tie, while the central portion is widened at 48 in order to provide better holding power. The loop is analogous in its construction and operation with the loop employed in the embodiment shown in Figs. 1 to 6 inclusive, and is removable, reversible, and longitudinally inclined. The free ends 49 of the loop 46 may both rotate and slide in the slots 40, thus enabling the loop 46 to assume a position analogous to any of the positions which may be assumed by the loop 146 of Figs. 1 to 6 inclusive.

The rear bar member 42 is provided with forward extensions 50 which bear resiliently against the free end portions of the front bar member 41 and permit the device to be clipped over the wings of a collar.

In the embodiment shown in Fig. 13 I provide a front bar member 21 and a rear bar member 22. These members are secured together at their central portions, as well as spaced with relation to each other, by a binding member 23. The central portion of this binding member 23 is dented inwards as shown at 24, in order to space apart the front and rear bar members 21 and 22. The portions 25 of the member 23, which are not indented, form sockets adapted to receive the free ends of a loop. While this loop is not shown, its construction and method of use will be obvious from what has been shown and described with regard to the analogous loops 146 of Figs. 1 to 6 inclusive and 46 of Figs. 10 to 12 inclusive.

In the embodiment shown in Figs. 14 and 15, I provide a front bar member 91, which has integral rearward extensions 93 and further extensions 92. The rear portions 92 are provided with forward extensions 100 which engage resiliently with the extensions 93 of the front bar member 91 and permit the device to be clipped over the wings of a collar in the usual way. Integral with the bar is an upward extension forming a loop 96, which has a narrow portion 97 and a wider portion 98—98.

By employing my invention the user will be enabled to retain the knot of his necktie in proper position at all times, and at the same time to secure the advantages of that type of collar bar which grips the wings of the collar, accomplishing these ends by the use of a simple and inconspicuous device which will not deform the knot of the tie.

Other advantages of the invention will be obvious from what has been above said with regard to its construction and operation.

I do not limit myself to the particular details of construction set forth in the foregoing specification and illustrated in the accompanying drawings, as the same refer to and set forth only certain embodiments of the invention, and it is obvious that the same may be modified, within the scope of the appended claims, without departing from the spirit and scope of the invention.

Having thus described my invention, what I claim as new and desire to secure by Letters Patent is as follows:

1. In a tie holding collar bar, the combination with a front bar member, a rear bar member, the end portions of said bar members engaging resiliently with each other, and a binder adapted to secure the central portions of said bar members with relation to each other; of a wire loop projecting upwardly from said binder, the ends of said wire being secured within said binder between said front and rear bar members, said loop being adapted to engage the knot of a necktie.

2. In a tie holding collar bar, the combination with a front bar member and a rear bar member secured thereto, the free ends of said bar members engaging resiliently with each other; of an upwardly projecting member having a center portion adapted to be thrust upward into the first-formed convolution of an asymmetrical knot of a four-in-hand necktie, said projecting member comprising a central loop formed from a length of wire twisted together at the bottom of said loop, said twisted portion being reflexed upwardly and rearwardly of said loop, and the free ends of said wire extending from the top of said twisted portion outwardly and then downwardly, and being secured to the ends of said rear bar member.

3. In a combined tie and collar holder, the combination with a collar bar member provided at each end portion with a jaw formed by said end portion and an oppositely disposed face member secured to said bar member and adapted to have clamped therebetween the wing of a collar; of an upwardly projecting member secured to said collar bar member and adapted to be thrust upward into the first-formed convolution of an asymmetrical knot of a four-in-hand necktie, and provided with a more constricted portion below and a more extended portion thereabove, whereby the said upwardly projecting member is adapted to be retained within the said convolution, and provided also with an uppermost portion more constricted than the said more extended portion and adapted to enter said convolution.

4. In a tie holding collar bar, the combination with a front bar member, a rear bar member, and spacing and binding means adapted to secure the central portions of said bar members rigidly together in spaced relation with each other, said spacing and binding means being provided with a socket; of an upwardly projecting member journaled in said socket and adapted to engage the knot of a necktie.

5. In a tie holding collar bar, the combination with a front bar member, a rear bar member, and spacing and binding means adapted to secure the central portions of said bar members rigidly together in spaced relation with each other, said spacing and binding means comprising a band surrounding the central portions of said bar members and holding same together, an indented portion of said band extending between said front and rear bar members and spacing them with relation to each other, and an unindented portion forming a socket; of an upwardly projecting member journaled in said socket and adapted to engage the knot of a necktie.

6. In a tie holding collar bar, the combination with a collar bar member provided at each end portion with a jaw formed by said end portion and an oppositely disposed face member secured to said bar member and adapted to have clamped therebetween the wing of a collar; of a loop projecting upwardly from said bar member and adapted to engage the knot of a necktie, said upwardly projecting loop being provided with a narrow upper portion adapted to enter said knot, a wider main portion adapted to retain same within said knot, and free ends adapted to engage said collar bar member, and a portion of the material of said loop between said wider main portion and each free end being in mutual resilient contact.

7. In a tie holding collar bar, the combination with a collar bar member provided at each end portion with a jaw formed by said end portion and an oppositely disposed face member secured to said bar member and adapted to have clamped therebetween the wing of a collar; of a member projecting upwardly from said bar member and adapted to be thrust up into the primary knot of a four-in-hand necktie, the medial point horizontally of said upwardly projecting member at its lower end being offset from the longitudinal central point of the said bar member in a longitudinal direction, whereby the main knot of the tie at the bottom end thereof may set at the middle longitudinally of the bar member.

8. In a combined tie and collar holder, the combination with a collar bar member provided at each end portion with a jaw formed by said end portion and an oppositely disposed face member secured to said bar member and adapted to have clamped therebetween the wing of a collar; of an upwardly projecting member secured to said collar bar member and adapted to be thrust upward into the first-formed convolution of an asymmetrical knot of a four-in-hand necktie, and provided with a more constricted portion below and a more extended portion thereabove, whereby said upwardly projecting member is adapted to be retained within the said convolution.

9. In a combined tie and collar holder, the combination with a collar bar member provided at each end portion with a jaw formed by said end portion and an oppositely disposed face member secured to said bar member and adapted to have clamped therebetween the wing of a collar, said bar member being provided with socket means secured to said bar member adjacent its central portion; of an upwardly projecting member adapted to be thrust upward into the first-formed convolution of an asymmetrical knot of a four-in-hand necktie, and provided at its lower end with projecting means removably engaging said socket means.

10. In a combined tie and collar holder, the combination with a collar bar member provided at each end portion with a jaw formed by said end portion and an oppositely disposed face member secured to said bar member and adapted to have clamped therebetween the wing of a collar, said bar member being provided with socket means secured to said bar member adjacent its central portion; of an upwardly projecting member adapted to be thrust upward into the first-formed convolution of an asymmetrical knot of a four-in-hand necktie, and provided at its lower end with projecting means pivotally engaging said socket means, whereby said upwardly projecting member is adapted to swing laterally with relation to said collar bar member and conform itself to variations in the position of the upper portion of the tie towards or away from the neck of the wearer.

11. In a combined tie and collar holder, the combination with a collar bar member provided at each end portion with a jaw formed by said end portion and an oppositely disposed face member secured to said bar member and adapted to have clamped therebetween the wing of a collar, said bar member being provided with socket means having oppositely disposed sockets and secured to said bar member adjacent its central portion; of an upwardly projecting member adapted to be thrust upward into the first formed convolution of an asymmetrical knot of a four-in-hand necktie, and provided at its lower end with oppositely disposed projecting means removably engaging said oppositely disposed sockets in said socket means.

12. In a combined tie and collar holder, the combination with a collar bar member provided at each end portion with a jaw formed by said end portion and an oppositely disposed face member secured to said bar member and adapted to have clamped therebetween the wing of a collar, said bar member being provided with socket means secured to said bar member adjacent its central portion; of an upwardly projecting member adapted to be thrust up into the first-formed convolution of an asymmetrical knot of a four-in-hand necktie, and provided at its lower end with projecting means loosely engaging said socket means, whereby said upwardly projecting member is adapted to tilt back and forth longitudinally with relation to the said bar member and to movably conform itself sidewise to the direction of said first-formed convolution.

13. In a combined tie and collar holder, the combination with a collar bar member provided at each end portion with a jaw formed by said end portion and an oppositely disposed face member secured to said bar member and adapted to have clamped therebetween the wing of a collar, said bar member being provided with socket means secured thereto adjacent its central portion; of an upwardly projecting member adapted to be thrust up into the first-formed convolution of an asymmetrical knot of a four-in-hand necktie, and provided at its lower end with projecting means loosely engaging said socket means, whereby said upwardly projecting member is adapted to swing laterally with relation to said collar bar member and also to tilt back and forth longitudinally with relation thereto and to movably conform itself to the direction of said first-formed convolution.

JOHN H. HOTSON.